US005667187A

United States Patent [19]

Doman et al.

[11] Patent Number: 5,667,187

[45] Date of Patent: Sep. 16, 1997

[54] SECURITY DEVICE

[75] Inventors: Milton J. Doman, Mechanicsville; Paul Crismond, Ruckersville; W. Edward White, Richmond, all of Va.

[73] Assignee: CDW Industries, Inc., Mechanicsville, Va.

[21] Appl. No.: 613,557

[22] Filed: Mar. 11, 1996

[51] Int. Cl.[6] .......... F16M 13/00

[52] U.S. Cl. .......... 248/551; 248/683

[58] Field of Search .......... 248/551, 205.3, 248/310, 222.51, 220.22, 500, 917, 682, 683; 411/910, 911; 70/58

[56] References Cited

U.S. PATENT DOCUMENTS

| | | | |
|---|---|---|---|
| 4,022,036 | 5/1977 | Cebuhar . | |
| 4,093,285 | 6/1978 | Fayle | 411/910 X |
| 4,189,123 | 2/1980 | Johnson | 248/222.51 |
| 4,391,376 | 7/1983 | Finnegan | 248/222.51 X |
| 4,691,891 | 9/1987 | Dionne . | |
| 4,709,897 | 12/1987 | Mooney | 248/551 |
| 4,723,866 | 2/1988 | McCauley | 411/910 X |
| 4,739,637 | 4/1988 | Finkel et al. . | |
| 4,841,838 | 6/1989 | Scully et al. | 411/910 X |
| 5,076,079 | 12/1991 | Monoson et al. | 70/58 |
| 5,082,233 | 1/1992 | Ayers et al. | 248/205.3 X |
| 5,199,838 | 4/1993 | Luke et al. | 411/910 X |
| 5,209,445 | 5/1993 | Bergetz | 248/551 |
| 5,401,133 | 3/1995 | Kuchler | 411/910 X |

*Primary Examiner*—Ramon O. Ramirez
*Attorney, Agent, or Firm*—Christopher W. Brody

[57] ABSTRACT

An anti-theft device for portable equipment, such as typewriters, personal computers, video recorders and general office equipment, is in the form of a support or stand which has two components that are mechanically joined by one or more recessed tamperproof screws. Each component has an adhesive strip. By means of these adhesive strips, one component is bonded to the underside of the equipment and the other component is bonded to a mounting surface. The two components can be joined together by tamperproof screws, making the equipment very difficult to remove except by means of a special tool designed for the screws. More than one device may be used with an equipment item so as to give adequate balance and support when the item has an irregular underside. Such a situation arises when the underside has a multiple-planar design or contains ventilation holes and calibration access portals. The device also includes additional means to secure the other component to the mounting surface to accommodate uneven surfaces or surfaces which may interfere with the bonding of the adhesive strip. The components can be inclined to adapt to different installation configurations. One component can also use a releasable coupling to hasten authorized removal of the equipment.

9 Claims, 4 Drawing Sheets

SECURITY DEVICE

FIELD OF THE INVENTION

The present invention relates to a device for securing portable equipment, such as personal computers, video recorders, typewriters, televisions and calculators, to desk and tables.

BACKGROUND ART

Portable equipment items pose a security problem for homes, businesses, schools, government offices and other institutions. Theft is a constant problem because of the ease with which such equipment is picked up and moved. Existing security devices for attaching portable equipment to desks and table surfaces are complex and cumbersome.

The prior art for devices to secure portable equipment is typified by U.S. Pat. No. 4,022,036 to Stanley W. Cebuhar issued May 10, 1977 and U.S. Pat. No. 4,739,637 to A. Milton Finkel and Stephan F. Bunka issued Apr. 26, 1988. Both provide an adhesive base for mounting the security device to a desk or other mounting surface. However, these patents disclose devices which are sized to cover the entire underside of equipment items.

U.S. Pat. No. 4,691,891 to Dionne discloses a device for preventing unauthorized removal of portable objects. In this patent, the device comprises a pair of members, each formed with an attachment base. On each attachment base is an adhesive securing surface. One adhesive securing surface is designed to attach to the portable object with the other adhesive securing surface designed to attach to a mounting surface. Each member includes connecting arms which are coupled together with tamperproof fastening means. Due to the nature of the adhesive, a large force must be utilized in order to remove the portable object.

An improvement over the device disclosed in the Dionne patent is illustrated in FIGS. 1 and 2. In this security device, L-shaped members 1 and 3 are used for securing the portable object. The L-shaped members 1 and 3 are held together with tamperproof fasteners 5. Each of the L-shaped members 1 and 3 include a strip of double side tape, preferably an acrylic tape for attachment to the portable object and a mounting surface, respectively.

With particular reference to FIG. 2, the L-shaped member 1 has through holes 9 with the L-shaped member 3 having threaded bores 11 therein. The fasteners 5 are then inserted through the through holes 9 to thread into the bores 11 to secure the members together. The threaded bores 11 may be formed by threading the member itself or by inserting threaded metal inserts into the appropriate openings, the inserts secured therein by conventional means.

One of the problems with these types of security devices is the inability to accommodate uneven mounting surfaces or surfaces having a coating or other material thereon which may compromise the adhesive qualities of the adhesive strip.

In addition, since two or more of these security devices are used to secure a portable object, it is time consuming for an authorized individual to remove the tamperproof fasteners for each device prior to portable object movement. These prior art devices also are not conducive to portable objects to be attached to mounting surfaces which may be inclined.

In view of the disadvantages of the prior art discussed above, a need has developed to provide improved security devices to accommodate different types of mounting surfaces and/or portable equipment. Responsive to this need, the present invention provides improved security devices which facilitate authorized portable object removal and use where the mounting surfaces may be uneven or have substances thereon which interfere with the adhesion provided by a security device.

SUMMARY OF THE INVENTION

Accordingly, it is a first object of the present invention to provide an improved security device for deterring the theft or unauthorized removal of portable objects such as computer equipment or the like.

Another object of the present invention is to provide a security device which includes means for attaching the device to uneven surfaces or surfaces not conducive to adhesion.

A further object of the present invention is to provide a security device which enhances the use of tamperproof fasteners by making it more difficult to manipulate them.

A still further object of the present invention is to provide a security device which utilizes a releasable coupling to make it easier for authorized removal of portable equipment.

Other objects and advantages of the present invention will become apparent as a description thereof proceeds.

In satisfaction of the foregoing objects and advantages, the present invention is an improvement over security devices for deterring theft of portable objects having a first member formed with an adhesive means for attaching the first member to the portable object and a second member formed with an adhesive means for attaching the second member to a mounting surface, each of the first and second members having connecting arms and tamperproof fasteners for coupling each connecting arm together to securely connect the portable object to mounting surface. The present invention includes an additional means for mechanically attaching the second member to the mounting surface to accommodate uneven mounting surfaces or surfaces having materials or coatings which may interfere with the adhesive means. Preferably, the means for mechanical attachment comprises at least one bore in the second member and a fastener sized to fit through the bore and attach to the mounting surface.

Another aspect of the invention, one of the first and second members or both can be inclined with respect to a longitudinal axis of either member to accommodate different mounting configurations.

The tamperproof fasteners can also be recessed to inhibit unauthorized manipulation thereof.

A security apparatus is also disclosed which comprises the combination of first and second security devices. The first security device uses the tamperproof fasteners and connecting arms of the first and second members for securing a portable object to a mounting surface. A second security device is provided which includes a third member with an adhesive means thereon for attachment to the portable object and a fourth member also formed with the adhesive means for attaching the fourth member to the mounting surface. Each of the third and fourth members have means for releasably coupling these members together without the need for additional fastening means. Thus, with the first and second security devices in place, an authorized person need only remove the tamperproof fasteners from the first security device so that the portable object can be lifted so as to disengage the releasable coupling of the second security device. Thus, the time needed to remove the portable object by an authorized person is greatly reduced.

BRIEF DESCRIPTION OF THE DRAWINGS

Reference is now made to the drawings of the invention wherein.

DESCRIPTION OF THE PREFERRED EMBODIMENTS

The present invention is an improvement over security devices which use adhesives and tamperproof fasteners to secure portable equipment in place.

Figure 1:
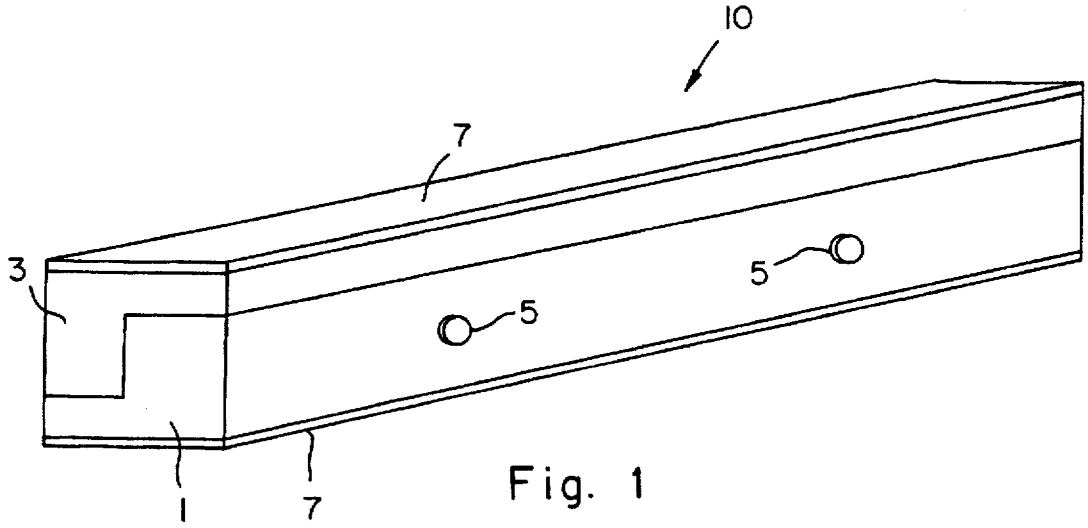
Fig. 1 PRIOR ART
FIG. 1 is a perspective view of a prior art security device.
Figure 2:
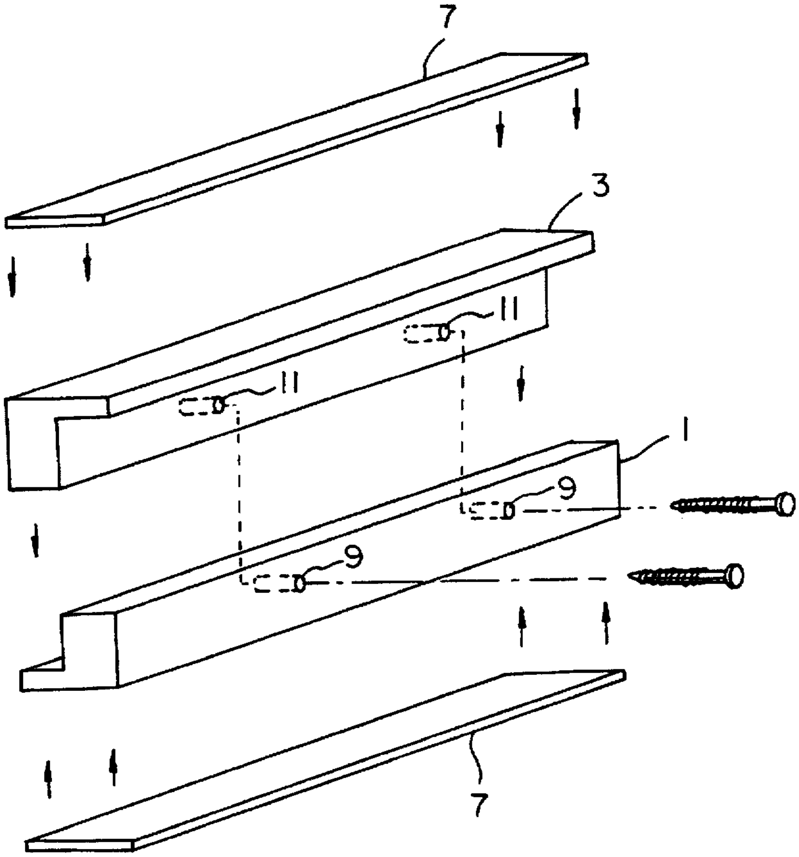
Fig. 2 PRIOR ART
FIG. 2 is an exploded perspective view of the device of FIG. 1.

The present invention offers improvements particularly over the prior art design depicted in FIGS. 1 and 2 as well as the Dionne patent discussed above.

Figure 3:
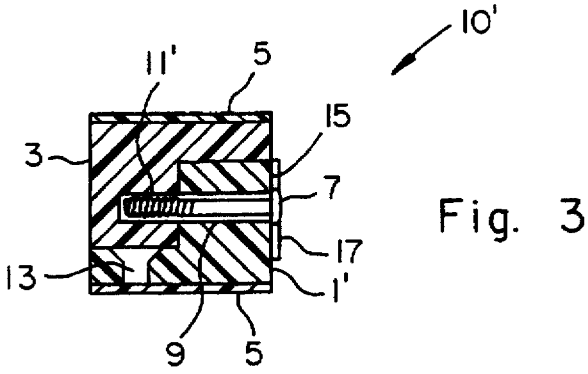
FIG. 3 is a sectional view of a first embodiment of the present invention.
Figure 4A:
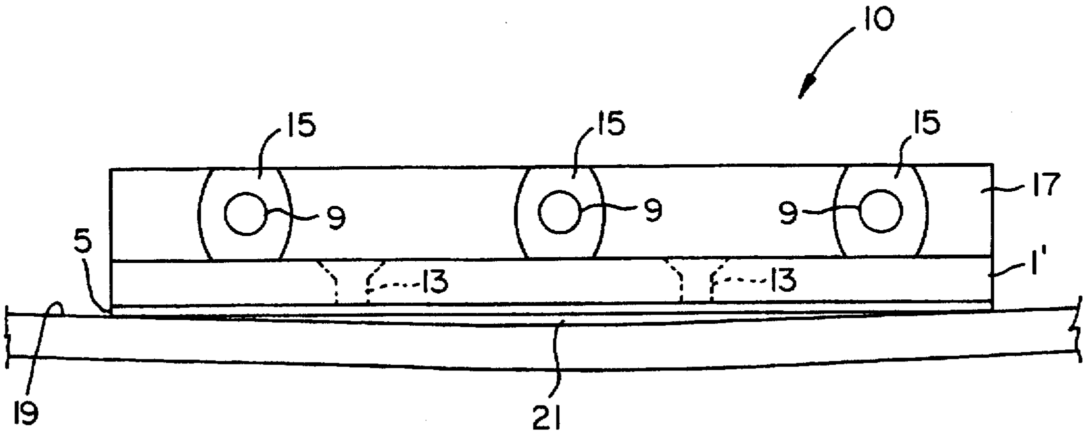
FIGS. 4*a* and 4*b* show before and after installation views of the embodiment of FIG. 3.
Figure 4B:
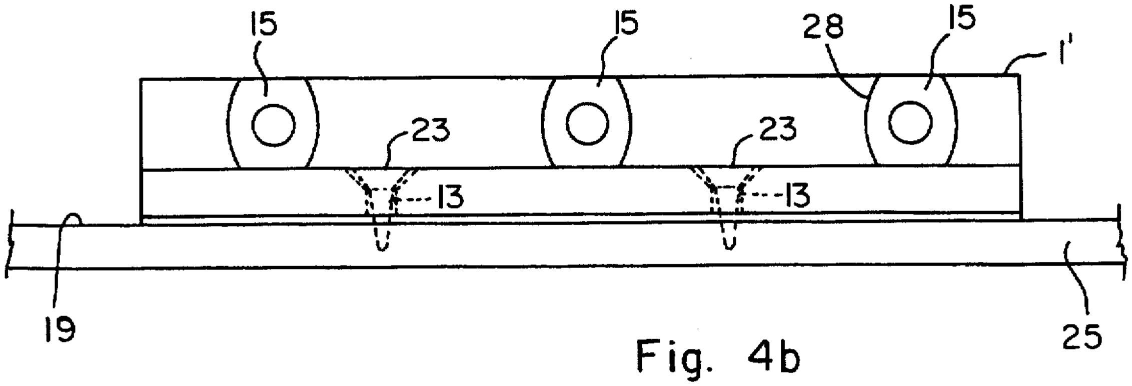

Referring now to FIGS. 3, 4*a* and 4*b*, a first embodiment of the inventive security device is generally designated by the reference numeral 10'. The device 10' includes a first L-shaped member 1' and a second L-shaped member 3. Each of the L-shaped members 1' and 3 include a double sided adhesive tape 5. The tape 5 attached to the L-shaped member 3 is designed to be attached to a portable object to be secured against theft. The adhesive tape 5 of the L-shaped member 1' is designed to adhere to a mounting surface.

Tamperproof fasteners 7 are provided to couple the L-shaped members 1' and 3 together. The tamperproof fastener 7 of FIG. 3 extends through the bore 9 in the L-shaped member 1' and into a threaded insert 11' located in the L-shaped member 3.

The L-shaped member 1' includes an additional means for securing the member to a mounting surface. Preferably, this means entails a bore 13 which permits the use of a fastener, the fastener being installed into the mounting surface prior to coupling of the L-shaped members together.

FIG. 4*a* illustrates the L-shaped member 1' when resting on an uneven mounting surface 19. As a result of unevenness of the mounting surface 19, a gap 21 exists between the adhesive 5 and the surface 19.

By installing fasteners 23 through the bores 13 and into the shelf 25, the adhesive 5 is put in contact with the entire mounting surface 19. Thus, a more secure attachment between the mounting surface 19 and L-shaped member 1' is realized, see FIG. 4*b*. This mechanical attachment is also conducive to mounting surfaces 19 which may have a coating or other substances thereon which may interfere with the adhesive properties of the adhesive tape 5. For example, if the surface 19 has paint, varnish or the like, this material may easily separate from the surface 19 which would compromise the holding power of the security device 10'.

FIGS. 3, 4*a* and 4*b* also illustrate another embodiment of the invention. Referring to FIG. 3, the tamperproof fastener 7 is situated in a recess 15 formed by the raised portion 17 on the L-shaped member 1'.

FIGS. 4*a* and 4*b* more clearly illustrate the recess 15 and the curved walls 28 of the raised portion 17.

Although a raised portion 17 is used on the L-shaped member 1' to form the recess 15, other recessed configurations can be used so that the tamperproof fastener 7 is surrounded, thus making unauthorized manipulation difficult.

Figure 5:
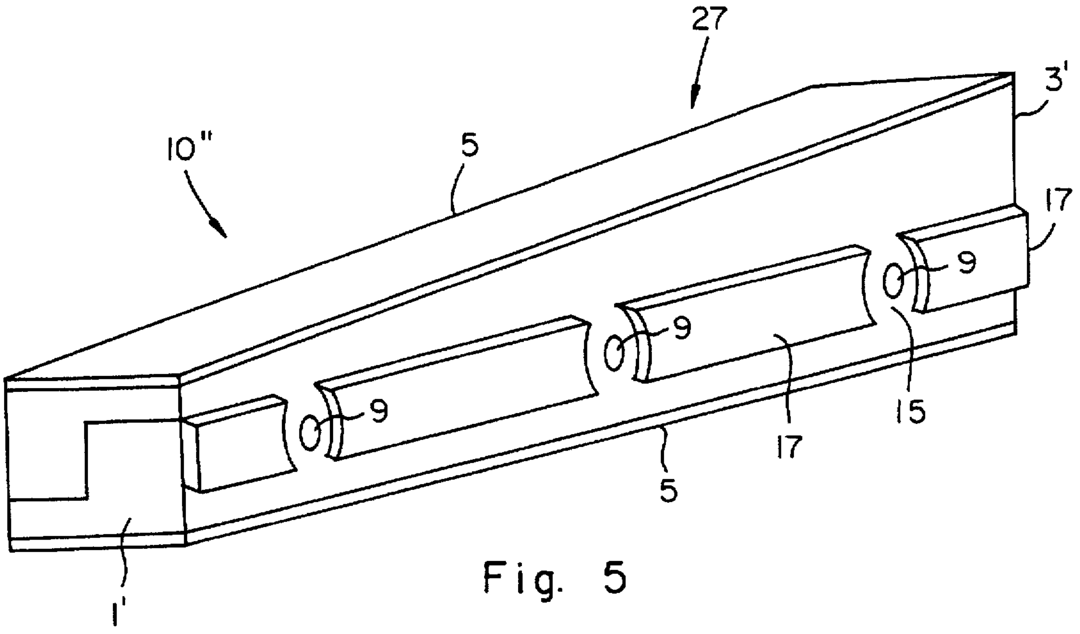
FIG. 5 is a perspective view of the security device illustrating second and third embodiments of the invention.

FIG. 5 illustrates another embodiment of the invention generally designated by the reference numeral 10". In this embodiment, the member designed to attach to a portable object utilizes an inclined surface 27. This configuration is useful when the portable equipment may have a sloping surface to which the security device would be attached. Of course, the reverse scenario may also be utilized wherein the L-shaped member 1' would have an inclined surface for attaching to a particular sloping mounting surface. In certain instances, both of the L-shaped members could have inclined surfaces depending on the configuration of both the portable equipment and mounting surface.

Figure 6:
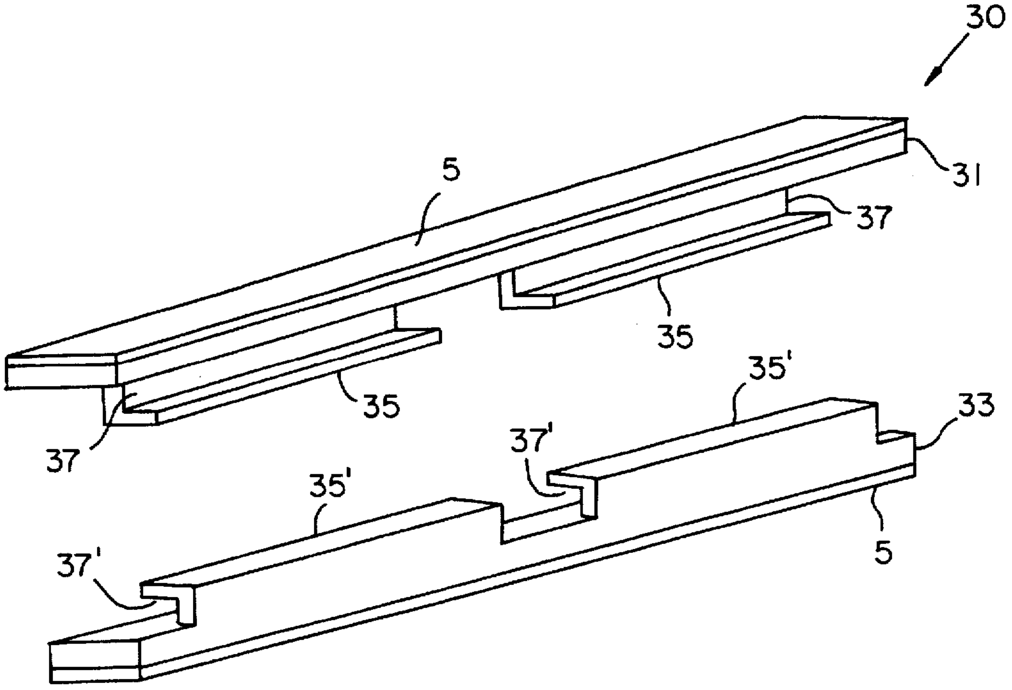
FIG. 6 is a perspective view of a fourth embodiment of the invention.

Referring now to FIG. 6, a still further embodiment of the invention is generally designated by the reference numeral 30. In this embodiment, an elongated member 31 is provided with the adhesive tape 5 on one surface thereof. Similarly, another elongated member 33 is provided with the adhesive tape 5. The elongated member 31 can be attached to the portable equipment with the elongated member 33 attached to a mounting surface. Of course, since members 31 and 33 are symmetric, the reverse of this attachment can also be used.

The elongated member 31 includes a pair of L-shaped legs 35, each leg 35 forming a slot 37. The elongated member 33 has complementary sized L-shaped legs 35', each leg 35' forming a slot 37' therein.

Figure 7A:
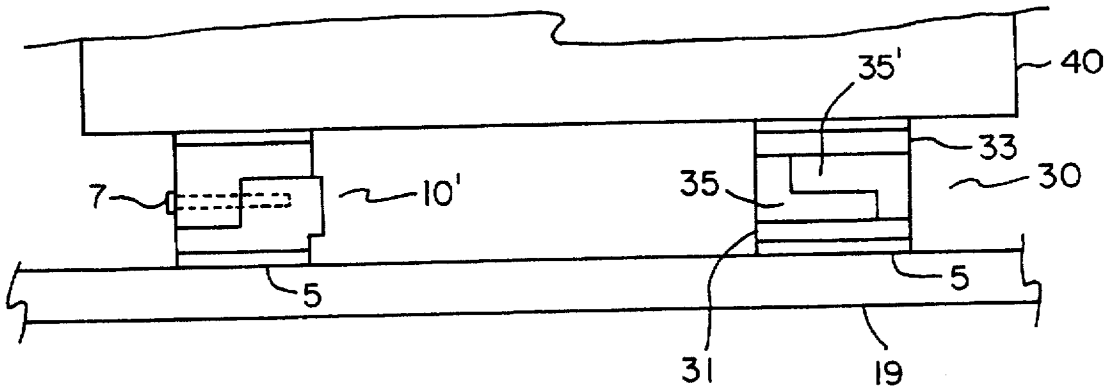
FIGS. 7*a* and 7*b* show the embodiment depicted in FIG. 6 in an exemplary use.
Figure 7B:
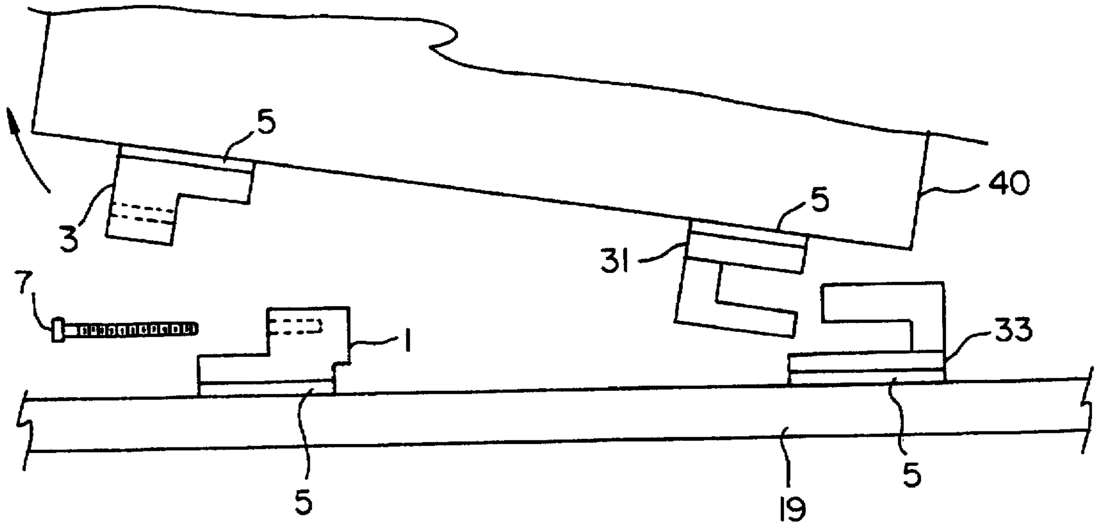

Referring now to FIGS. 7*a* and 7*b*, the device 30 is shown in use with the device 10'. More specifically, the legs 35' nest with the legs 35 to form a releasable coupling. The releasable coupling formed between the nesting of the legs 35 and 35' facilitate removal of a portable object, designated as reference numeral 40 in FIGS. 7*a* and 7*b*, by removing the tamperproof fastener 7 from the security device 10'. With the releasable coupling, only one tamperproof fastener-containing security device is needed to secure the portable equipment 40. Thus, when the equipment 40 has to be moved, less time is required for movement thereof. Moreover, due to the adhesive used on the device 30 and the nesting of the legs 35 and 35', the same level of anti-theft deterrence is provided when using the device 30 in combination with the device 10'.

The legs 35 and 35' are illustrative of a releasable coupling for the device 30. Any type of releasable coupling could be utilized for the members 31 and 33 other than the L-shaped legs 35 and 35'.

It should be understood that the security devices of the invention can be formed of any known material and use any known adhesive means for securement purposes. Moreover, the security devices may be shaped in different lengths, widths and degrees of inclination to afford flexibility in securing portable equipment of any type. The placement of the security devices may also vary depending on the portable equipment design.

In the embodiment depicted in FIGS. 6, 7*a* and 7*b*, placement of the devices 10' and 30 should be such that the portable equipment can be moved such that the releasable coupling can be disengaged for equipment movement purposes.

As such, an invention has been disclosed in terms of preferred embodiments thereof which fulfill each and every one of the objects of the present invention as set forth here and above and provides a new and improved security device.

Of course, various changes, modifications, and alterations from the teachings of the present invention may be contemplated by those skilled in the art without departing from the intended spirit and scope thereof. Accordingly, it is intended that the present invention only be limited by the terms of the appended claims.

We claim:

1. In a security device for deterring theft of a portable object having a first member formed with an adhesive means for attaching the first member to the portable object and a second member formed with an adhesive means for attaching the second member to a mounting surface, each of the first and second members being L-shaped in cross section so as to have a connecting arm and a leg extending perpendicularly therefrom, each connecting arm joined together by tamperproof fasteners to securely connect said portable object to the mounting surface, the improvement comprising a plurality of countersunk bores extending through said leg of said second member and a fastener for each countersunk bore, each said fastener sized to penetrate said mounting surface for attaching said leg of said second member thereto and wherein the connecting arm of the second member has a throughhole to receive each of the tamperproof fasteners, the throughhole of the connecting arm of the second member extending between an outer side face thereof and an inner face abutting the connecting arm of the first member, wherein the connecting arm of the first member has a throughhole for threadable attachment with each of the tamperproof fasteners, an outer side face of the second member having a recess surrounding each of the through holes to interfere with tampering of the tamperproof fasteners and wherein said first member has a surface for said adhesive means, said surface inclined with respect to a longitudinal axis of the first member.

2. The security device of claim 1 wherein the throughhole in the connecting arm of the first member includes a threaded insert for threadable attachment with each of the tamperproof fasteners.

3. The security device of claim 1, wherein the outer side face has a raised portion which surrounds portions of the outer side face adjacent the through holes to form the respective recesses.

4. The security device of claim 3, wherein the raised portion includes curved side walls which partially surround a head of the tamperproof fastener, said curved side walls separated by a pair of openings, a base of the openings coinciding with the outer side face of the second member.

5. A security apparatus device for deterring theft of a portable object comprising:

(a) a first security device comprising a first L-shaped member formed with an adhesive means for attaching the first member to the portable object and a second L-shaped member formed with an adhesive means for attaching the second member to a mounting surface, each of the first and second members having connecting arms and tamperproof fasteners for coupling each connecting arm together to securely connect said portable object to the mounting surface, and b) a second security device comprising a third member formed with an adhesive means for attaching the third member to the portable object and a fourth member formed with an adhesive means for attaching the fourth member to a mounting surface, each of the third member and the fourth member has a base and at least one L-shaped leg, a free ended member of the at least one L-shaped leg and said base of each of the third and fourth members forming a cavity, the free ended member of the at least one L-shaped leg of the third member sized to engage the cavity formed by the free ended member and the base of the fourth member so that the L-shaped legs of the third and fourth members nest with each other to releasably couple the third and fourth members together, the releasably coupling permitting the portable object to be moved by removal of the tamperproof fasteners coupling the first and second members together.

6. The security device of claim 5, further comprising means for mechanically attaching at least one of the second member and the fourth member, respectively, to the mounting surface.

7. The security device of claim 5, wherein the first member has a through hole to receive each of the tamperproof fasteners and the second member has a threaded insert for threadable attachment with each of the tamperproof fasteners, the first member having a recess surrounding each of the through holes to interfere with tampering of the tamperproof fasteners.

8. The security device of claim 7, wherein the through holes extend from an outer side face of the first member to an inner face thereof, the outer side face having a raised portion which surrounds portions of the outerside face adjacent the through holes to form the respective recesses.

9. The security device of claim 8, wherein the raised portion includes curved side walls surrounding the outer side face portions.

* * * * *